Dec. 19, 1961     T. H. KERRY ET AL     3,013,385
AIR INTAKE FOR POWER PLANT OF SUPERSONIC AIRCRAFT
Filed Sept. 15, 1958     4 Sheets-Sheet 2
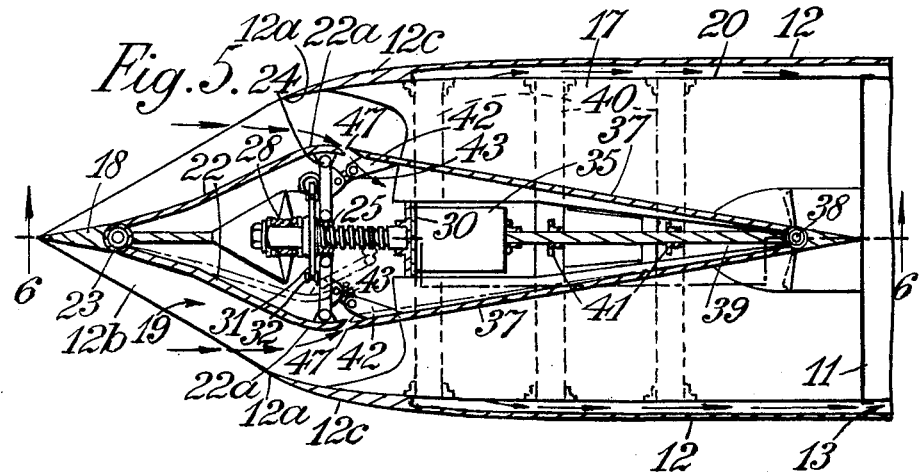
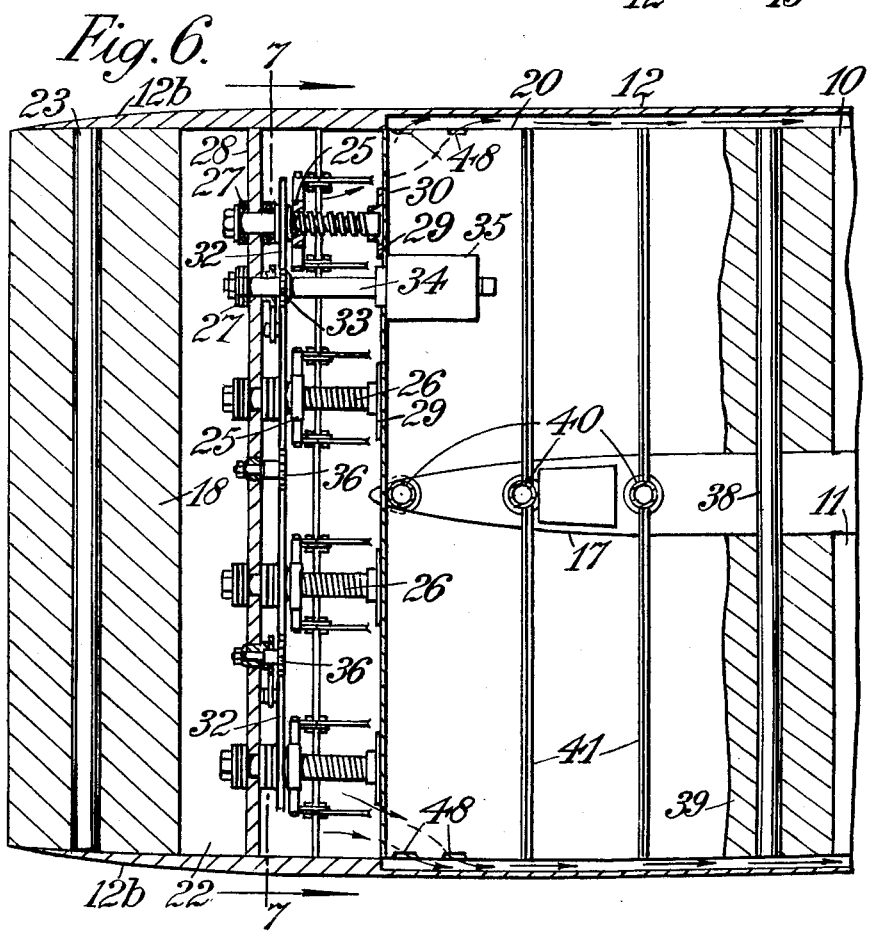

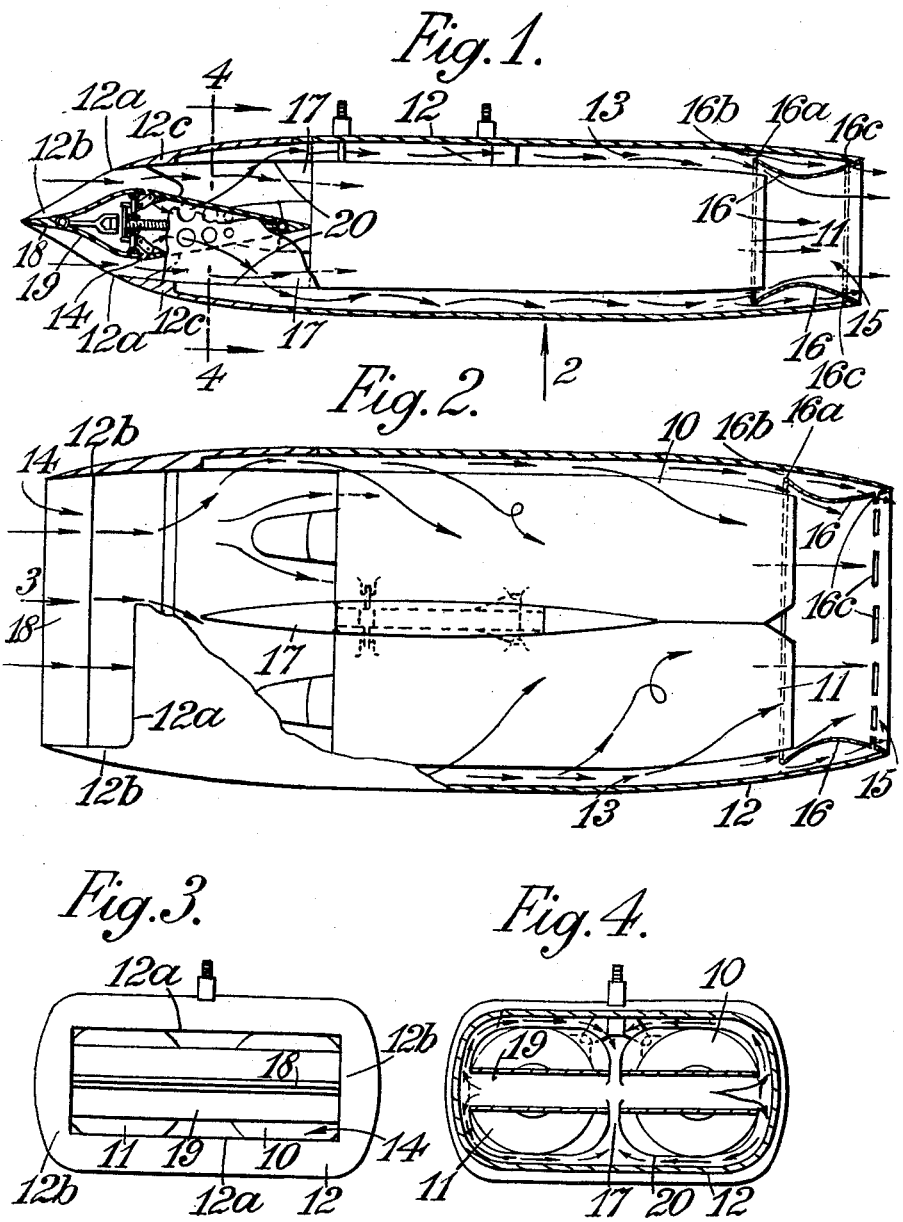

Dec. 19, 1961 T. H. KERRY ET AL 3,013,385
AIR INTAKE FOR POWER PLANT OF SUPERSONIC AIRCRAFT
Filed Sept. 15, 1958

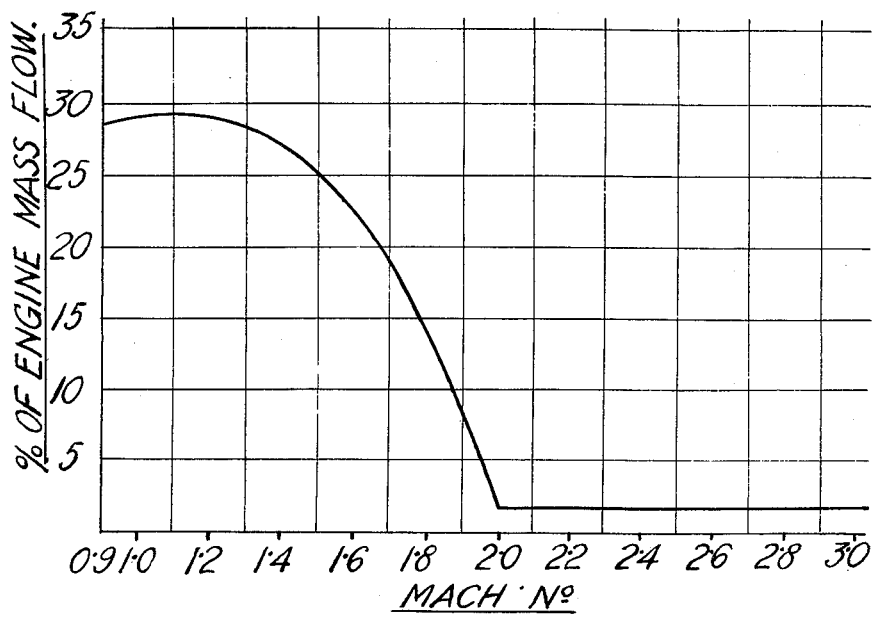

3,013,385
AIR INTAKE FOR POWER PLANT OF SUPERSONIC AIRCRAFT
Thomas Henry Kerry, Derby, and Peter Arthur Ward, Littleover, Derby, England, assignors to Rolls-Royce Limited, Derby, England, a company of Great Britain
Filed Sept. 15, 1958, Ser. No. 760,978
Claims priority, application Great Britain Sept. 27, 1957
3 Claims. (Cl. 60—35.6)

This invention relates to power plant of the kind comprising air consuming engines, such as gas-turbine jet-propulsion engines, and of the kind employed with aircraft designed for flight at supersonic speeds.

The invention is concerned more particularly with air intakes for such power plant and has for an object to provide an improved form of supersonic air intake permitting part of the air entering the intake to be abstracted to assist the efficient operation of a propulsion nozzle through which exhaust gases from the power plant flow and/or for purposes such as engine cooling.

According to the present invention, an air intake for use with a power plant of the kind referred to comprises an outer wall structure, a centre body within the outer wall structure, the wall structure and centre body defining between them an air intake passage and the centre body having a portion which projects forwardly beyond the leading edge of the outer wall structure and is shaped to create shock waves tending to come to a focus just outside the leading edge of the outer wall structure, whereby a build up of pressure occurs within the intake passage, said centre body having in its external surface aperture means to permit air to flow from the intake passage into the interior of the centre body and means to convey air entering the centre body to the power plant for ancillary purposes.

Preferably, the aperture means in the centre body is variable in effective area to permit variation of the quantity of air entering the centre body, and in one preferred arrangement in which the abstracted air is fed from within the centre body to an ejector nozzle, through which engine exhaust gases flow to atmosphere, the effective area of the aperture means is varied in accordance with the flight Mach No. to obtain a desired variation of the quantity of air flowing through the aperture means.

Such variation of the effective area of the aperture means may be effected by adjusting forward and rearward portions of the centre body relative to one another; for instance, the surfaces of forward or rearward portions or both portions of the centre body may be formed by pivoted flaps which are caused to swing to vary the aperture area, or the forward portion may be displaceable bodily axially of the intake relative to the rearward portion. In such arrangements, the adjustment of the forward portion of the centre body may also cause variation of the area of throats formed in the intake passage upstream of the aperture means.

The invention has for another object to provide an improved air intake structure for supplying a plurality of engines arranged side by side. In accordance with this object of the invention, an air intake structure for a power plant of the class comprising a plurality of air consuming engines arranged side by side has at its forward end a substantially rectangular air inlet and comprises ducting walls extending rearwardly from said air inlet to said engines, said walls including a pair of opposite walls extending rearwardly from a pair of opposite edges of said air inlet, and said air intake structure further comprising a center body disposed centrally between said pair of opposite walls and co-operating with said walls to define air passages conveying air directly from said air inlet to said engines, said center body having a forward section and a rearward section, the forward section projecting forwardly from said air inlet and comprising a pair of flaps which are hinged to swing about their forward edges, which diverge rearwardly and which lie on opposite sides of a plane centrally between said pair of opposite walls, said flaps extending through said air inlet and co-operating with said pair of opposite walls to define portions of said air passages and said flaps on swinging varying the dimensions of the air inlet, said rearward section comprising a pair of flaps converging towards their rearward edges and pivoted to swing about their rearward edges, the flaps of the rearward section lying on opposite sides of said plane, the rear edges of the flaps of the forward section being spaced away from the forward edges of the flaps of the rearward section to define gaps placing a space enclosed by the flaps in communication with the air passages, means interconnecting and effecting correlated swinging of the flaps of the forward and rearward sections to control the spacing of the rear edges of the flaps of the forward section and the forward edges of the flaps of the rearward section thereby to control the areas of said gaps.

The flaps preferably co-operate with the pair of walls to define throats in the intake ducting and so that by adjusting the flaps, the effective areas of the throats may be varied in a desired manner, for instance in accordance with variations on Mach number.

Some embodiments of the air intake of this invention will now be described with reference to the accompanying drawings in which:

FIGURE 1 is a section through a power plant having one form of intake;

FIGURE 2 is a view in the direction of arrow 2 on FIGURE 1, parts being broken away;

FIGURE 3 is a view in the direction of arrow 3 on FIGURE 2;

FIGURE 4 is a section on the line 4—4 of FIGURE 1;

FIGURE 5 is a view of the intake to a larger scale;

FIGURE 6 is a section on the line 6—6 of FIGURE 5;

FIGURE 9 is a graph illustrating the quantity of air required at various Mach numbers.

Figure 7:
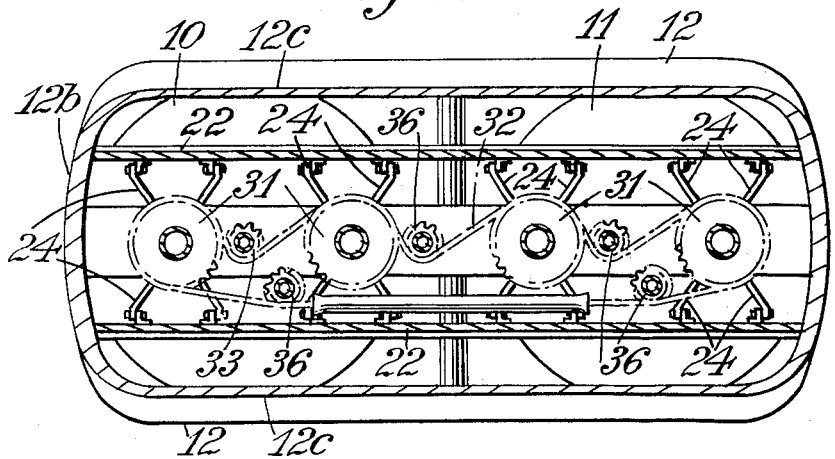
FIGURE 7 is a section on the line 7—7 of FIGURE 6.

The power plant illustrated in FIGURES 1 and 2 comprises a pair of gas-turbine jet-propulsion engines 10, 11 which are enclosed in a cowling structure having an outer skin 12 spaced from the casings of the engines to leave an air passage 13, the purpose of which will appear below.

The engines 10, 11 are fed with air through an air intake arrangement 14 at the forward end of the cowling structure and the exhaust gases leave the engines and flow through a common exhaust outlet 15, the cowling structure adjacent the outlet being shaped by an internal fairing 16 to provide a convergent/divergent propulsion nozzle to produce a thrust boost and so that the exhaust gases flowing through the outlet 15 have an ejector effect assisting to create an air flow outside the engines in the passage 13 which reduces the decrease in efficiency of the propulsion nozzle at off-design conditions and also cools the engines.

For flight at supersonic speeds a propulsion nozzle of convergent/divergent form provides a useful increase in thrust compared with a nozzle of convergent form. This increase in thrust is most marked at the particular flight Mach number for which the nozzle is designed and at other flight Mach numbers the performance deteriorates, e.g. at lower flight Mach numbers the exhaust gases are over-expanded. The air flowing through passages 13 into the outlet 15 is used to reduce or avoid such overexpansion to improve the efficiency of the nozzle at off-design conditions.

The upstream edge 16a of the fairing 16 is rolled over and spaced inwards from the outer skin to form a gap 16b and slots 16c are formed at the downstream edge of the fairing 16 to permit a flow of air from the passages 13 to by-pass the outlet 15 and flow between the outer skin 12 and fairing 16. At the design condition of the nozzle the ejector effect will become very small and most of the air flowing in the passages 13 will flow through the opening 16b and slots 16c.

The inlet opening of the air intake 14 is rectangular as viewed from the front of the power plant (FIGURE 3), the longer sides of the opening being formed by the leading edges 12a of wall portions 12c of the cowling structure, the shorter sides of the rectangular opening being defined by forwardly-tapering walls constituting spill barriers 12b which project beyond the leading edges 12a of the wall portions 12c. The forward ends of the spill barriers 12b are joined by a fixed cross-strut 18.

The cross-strut 18 forms the leading portion of a centre body structure 19 which extends across the intake between the barriers 12b and also extends rearwardly through the rectangular opening of the intake 14 in spaced relation to the wall portions 12c to adjacent the inlet ends of the engines 10, 11. The centre body structure 19 defines, together with the wall portions 12c, with a wall 20 fitted within the cowling and with a pair of hollow streamlined fairings 17, a pair of air intake ducts which are separated by the fairings 17. The fairings 17 extend parallel to the direction of air flow from adjacent the edges 12a rearwardly to between the pair of engines 10, 11, and also extend from the wall 20 into the centre body structure 19. The centre body structure 19 and the portions 12c of the cowling structure just downstreams of the edges 12a are shaped to define throats at the inlet ends of the air ducts.

The centre body 19 in the constructions illustrated is adapted to permits the effective areas of the throats to be varied, and also to permit abstraction from the air intake ducts of a variable quantity of air as desired. The air so abstracted may be used for a variety of purposes, for instance cooling parts of the engine, but in the constructions illustrated the air is supplied to the passages 13 to leave the engine through the exhaust outlet 15. The supply of air in this way assists the operation of the convergent/divergent propulsion nozzle formed by the fairing 16. The air also acts to cool the outside of the engines during its flow through the passages 13.

One form of centre body is shown in detail in FIGURES 5 to 7. This form comprises the cross-strut 18 which is triangular in section and has its apex forwardly projecting, a forward adjustable section and a rearward adjustable section.

The forward adjustable section comprises a pair of flaps 22 pivoted at their forward edges to a hinge pin 23 extending along the length of the cross-strut 18, the flaps 22 diverging rearwardly and being slightly concave over their leading portions and convex over the after portions 22a which lie within and co-operate with the wall portions 12c of the cowling structure to define the intake throats. The shape of the flaps 22 is such that a supersonic flight speeds shock waves are created which tend to come to a focus just outside the leading edge 12a of the cowling structure 12, thereby causing build up of pressure within the air intake.

The rearward edges of the flaps 22 are connected by links 24 to nuts 25 working on threaded members 26 which are rotatably supported at their forward ends in bearings 27 carried on a bar 28 extending from one barrier 12b to the other, and, at their opposite ends, in bearing sockets 29 (FIGURE 6) carried on a wall 30. Each threaded member 26 has secured to it a sprocket 31 and a driving chain 32 runs over the sprockets 31 and over a driving sprocket 33 mounted on the shaft 34 of a motor 35, for instance a fluid motor. The chain 32 also runs over idler sprockets 36. On operation of the motor 35, the threaded members 26 rotate and the nuts 25 run along them so causing the flaps 22 to pivot thereby to increase and decrease the throat area.

By arranging the threaded member 26 axially, as shown, the load transferred to the motor when the flaps 22 are fully open, and therefore most highly stressed, is reduced virtually to zero since the load acts at right angles to the axes of the threaded member 26.

The rearward adjustable section comprises a pair of flaps 37 extending rearwardly from a point somewhat spaced from the rear edges of the flaps 22 to close to the engine intakes, where the flaps 37 are pivoted on a hinge pin 38 mounted in a wall 39 extending between the sides of the cowling structure in a plane containing the axes of the engines. The flaps 37 are plane and converge in the direction of air flow. The flaps 37 are cut away where the fairings 17 pass through them. The wall 39 may be supported by struts 40 extending within the fairings 17 from the wall 20 and by angle-section members 41, and the motor 35 may be secured to the wall 39.

The forward edges of the flaps 37 carry lugs 42 to which are pivoted links 43 connecting the lugs 42 to the links 24 so that the flaps 37 are adjusted simultaneously with the flaps 22, and the linkage is such that as the flaps 22 move apart the flaps 37 also move apart to a lesser extent and vice-versa.

Instead of a linkage as just described, the links 24 may carry pins 45 (FIGURE 8) which engage cam grooves 46 in brackets 47 on the flaps 37, the grooves 46 being shaped to achieve the desired relative movements of the flaps 22, 37.

Figure 8:
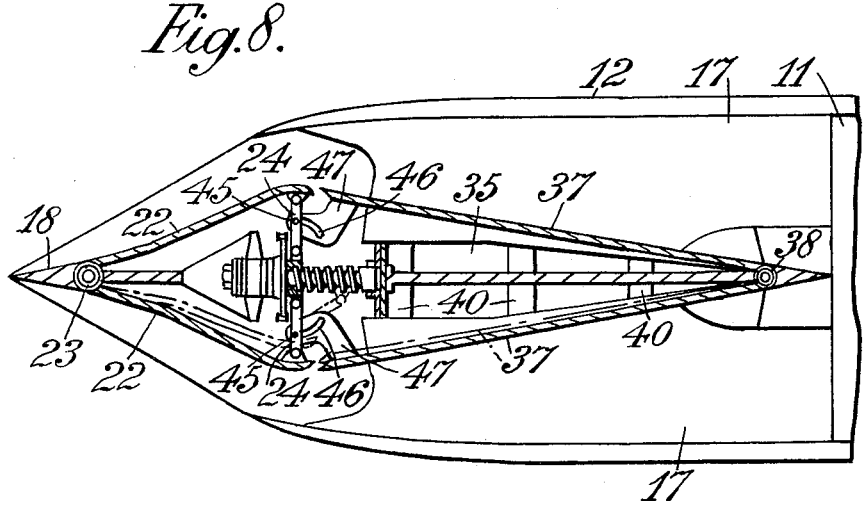
FIGURE 8 is a view corresponding to FIGURE 5 of a second form of intake.

It is preferably arranged that at design Mach number the flaps 22, 37 are in the position shown in full lines in FIGURES 5 and 8 and that below a selected value of the Mach number the flaps 22 are moved towards one another to the position shown in dotted lines in FIGURES 5 and 8 so increasing the throat area and the flaps 37, actuated by the linkage described in the previous paragraph, move towards one another to a lesser extent than the flaps 22 so as to increase the area of the opening 47 between the adjacent edges of the flaps 22, 37 thereby to increase the quantity of air abstracted from the intake flow to enter the space between the flaps.

Since the quantity of air required varies with actual flight Mach number, the motor 35 is preferably controlled by means responsive to Mach number or a condition within the intake which is dependent on the Mach number, for example the air temperature within the intake.

The abstracted air flows from the space between the flaps 37 through holes 48 in the walls 20 into the passage 13 and then flows rearwards to leave the power plant with the engine exhaust gases through outlet 15.

FIGURE 9 is a graph illustrating the relationship between flight Mach No. and the quantity of air, expressed as a percentage of the engine mass flow, required as to be delivered to a typical ejector nozzle 15 forming the exhaust outlet of the engine. The flaps 22, 37 will be adjusted by the motor 35 to vary the effective area of the opening 47 to give the desired relationship of Mach No. and abstracted air.

It will be seen that at supersonic speeds, as the Mach No. increases the percentage quantity of air required for the ejector nozzle first decreases and then remain substantially constant, and thus, as the Mach No. increases, the effective area of the opening 47 will be decreased gradually to a minimum value at a particular value of Mach No. whereafter the area will be maintained constant. The constant percentage mass flow of air shown at Mach 2.0 and higher flight speeds passes through the opening 16b and slots 16c in the fairing 16.

We claim:

1. An air intake for use with a power plant of the kind referred to comprising an outer wall structure, a center body within the outer wall structure, the outer wall structure and center body defining between them an air intake passage and the center body having a portion which projects forwardly beyond the leading edge of the outer wall structure and is shaped to create shock waves tending to come to a focus just outside the leading edge of the outer wall structure, whereby a build up of pressure occurs within the intake passage, said center body having in its external surface aperture means to permit air to flow from the intake passage into the interior center body, said center body comprising relatively adjustable forward and rearward sections, each of said forward section and said rearward section comprising pivoted flaps, the flaps of the forward section having rear edges spaced from forward edges of the flaps of the rearward section to define gaps constituting said aperture means, motor means connected to effect correlated swinging of the flaps of both the forward and rearward sections to vary the area of the gaps between the said edges of the flaps, and means to convey air entering the center body to the power plant for ancillary purposes.

2. In a power plant of the class comprising a plurality of air consuming engines arranged side by side, an air intake structure connected to feed air to the engines, said air intake structure having at its forward end a substantially rectangular air inlet and comprising ducting walls extending rearwardly from said air inlet to said engines, said walls including a pair of opposite walls extending rearwardly from a pair of opposite edges of said air inlet, and said air intake structure further comprising a center body disposed centrally between said pair of opposite walls and co-operating with said walls to define air passages conveying air directly from the air inlet to the engines, said center body having a forward section and a rearward section, the forward section projecting forwardly from said air inlet and comprising a pair of flaps which are hinged to swing about their forward edges, which diverage rearwardly and which lie on opposite sides of a plane centrally between said pair of opposite walls, said flaps extending through said air inlet and co-operating with said pair of opposite walls to define portions of said air passages and on swinging varying the dimensions of the air inlet, said rearward section comprising a pair of flaps converging towards their rearward edges and pivoted to swing about their rearward edges, the flaps of the rearward section lying on opposite sides of said plane, the rear edges of the flaps of the forward section being spaced away from the forward edges of the flaps of the rearward section to define air-abstraction gaps placing a space enclosed by the flaps in communication with the air passages to receive air therefrom, air-conveying means connected between said space and the engines to convey air from the space to the engines for ancillary purposes, and means interconnecting and effecting correlated swinging of the flaps to vary the spacing of the rear edges of the flaps of the forward section and the forward edges of the flaps of the rearward section thereby to control the areas of the gaps and the flow of air from said air passages into said space and from said space to said air-conveying means.

3. A power plant comprising a plurailty of engines arranged side by side; an air intake conveying air to said engines and having a substantially rectangular inlet, ducting walls leading from the inlet to the engine and including a pair of opposite walls entending rearwards from a pair of opposite edges of the inlet, a center body within said ducting between and in spaced relation to said pair of opposite walls, the center body and the ducting walls co-operating to define air passages, the center body having a forward section and a rearward section, the forward section comprising a pair of flaps disposed one on each side of a plane which is centrally between said pair of opposite walls, said flaps having rear edges and front edges and converging forwardly of the intake from within the ducting walls to forwardly of the inlet, said flaps being pivoted at their forward edges to swing towards and away from said central plane to vary the effective area of said inlet, the rearward section comprising a pair of flaps disposed one on each side of said central plane, said flaps of the rearward section having front and rear edges, converging towards their rear edges and being pivoted at their rear edges to swing towards and from said central plane, the rear edges of the flaps of the forward section being spaced, in some positions at least of the flaps, away from the front edges of the flaps of the rearward section to define gaps providing an air supply communication between the air passages and a space enclosed by the flaps; a cowling structure enclosing the engines and defining a cooling air passage around the engines, the cooling air passage being in communication with said space to receive air therefrom adjacent the forward end of the cowling structure and having an outlet adjacent the rearward end of the cowling structure; an ejector nozzle at the rearward end of the cowling structure, said outlet of the cooling air passage opening to said nozzle and said engines delivering exhaust gas through said nozzle to draw air from the cooling air passage; and means interconnecting and effecting correlated swinging adjustment of the flaps of both the forward and rearward sections thereby to vary the area of said gaps and to vary the air flow through the gaps, said space and said cooling air passage.

References Cited in the file of this patent
UNITED STATES PATENTS

| | | |
|---|---|---|
| 2,509,238 | Martin | May 30, 1950 |
| 2,527,732 | Imbert | Oct. 31, 1950 |
| 2,625,008 | Crook | Jan. 13, 1953 |
| 2,648,192 | Lee | Aug. 11, 1953 |
| 2,788,635 | Ford | Apr. 16, 1957 |
| 2,840,322 | Griffith | June 24, 1958 |
| 2,848,867 | Hausmann | Aug. 26, 1958 |
| 2,853,854 | Avery et al. | Sept. 30, 1958 |
| 2,861,419 | Hausmann | Nov. 25, 1958 |

FOREIGN PATENTS

| | | |
|---|---|---|
| 747,705 | Great Britain | Apr. 11, 1956 |